United States Patent
Schuessler

(10) Patent No.: US 7,206,431 B2
(45) Date of Patent: Apr. 17, 2007

(54) SYSTEM AND METHOD FOR GENERATING AND VERIFYING A SELF-AUTHENTICATING DOCUMENT

(75) Inventor: Frederick Schuessler, Baiting Hollow, NY (US)

(73) Assignee: Symbol Technologies, Inc., Holtsville, NY (US)

(*) Notice: Subject to any disclaimer, the term of this patent is extended or adjusted under 35 U.S.C. 154(b) by 763 days.

(21) Appl. No.: 10/370,175

(22) Filed: Feb. 19, 2003

(65) Prior Publication Data

US 2003/0210802 A1 Nov. 13, 2003

Related U.S. Application Data

(60) Provisional application No. 60/358,848, filed on Feb. 22, 2002.

(51) Int. Cl.
G06K 9/00 (2006.01)
G05B 19/00 (2006.01)

(52) U.S. Cl. .................. 382/100; 382/112; 340/5.86

(58) Field of Classification Search ................ 382/100, 382/112; 340/5.86
See application file for complete search history.

(56) References Cited

U.S. PATENT DOCUMENTS

| | | | | |
|---|---|---|---|---|
| 5,765,176 A | * | 6/1998 | Bloomberg | ................. 715/514 |
| 6,487,301 B1 | * | 11/2002 | Zhao | ........................... 382/100 |
| 6,608,911 B2 | * | 8/2003 | Lofgren et al. | ............. 382/100 |
| 6,751,352 B1 | * | 6/2004 | Baharav et al. | ............. 382/183 |
| 6,929,413 B2 | * | 8/2005 | Schofield | .................... 400/103 |
| 6,970,573 B2 | * | 11/2005 | Carr et al. | .................. 382/100 |
| 2005/0161512 A1 | * | 7/2005 | Jones et al. | ................. 235/487 |

* cited by examiner

Primary Examiner—Bhavesh M. Mehta
Assistant Examiner—Utpal Shah
(74) Attorney, Agent, or Firm—Fay Kaplun & Marcin, LLP

(57) ABSTRACT

Described are a system and method for verifying a self-authenticating document. First, an image is obtained of at least a predetermined portion of the document. Then, the image is divided into a predetermined number of pixel groups, each pixel group including a plurality of pixels and pixel characteristic data for each pixel is determined. A pixel group classification data for each pixel group is determined as a function of the pixel characteristics data. Based on the pixel group classification data and a location of the corresponding pixel group in the image, a characteristic digital data "CDD" for the image is generated. The CDD is added to the document. Upon a request for verification of the document, the CDD is extracted from the document. Then, a further CDD based on the image is generated. The document is verified only if the CDD is substantially identical to the further CDD.

20 Claims, 8 Drawing Sheets

TABLE A

| Luminance Value | Luminance | Luminance Subset | Bit Representation |
|---|---|---|---|
| 192-255 | | 3 | 11 |
| 128-191 | | 2 | 10 |
| 64-127 | | 1 | 01 |
| 0-63 | | 0 | 00 |

Figure 3C

SYSTEM AND METHOD FOR GENERATING AND VERIFYING A SELF-AUTHENTICATING DOCUMENT

PRIORITY CLAIM

This application claims the benefit of U.S. Provisional Patent Application Ser. No. 60/358,848 filed Feb. 22, 2002 and entitled "Secure Association of Photographs with Digital Information". This application is expressly incorporated herein, in its entirety, by reference.

BACKGROUND INFORMATION

Recently, there has been resurgence of interest in creating the next generation of identification ("ID") cards that provide greater security then previously issued ID cards. The new ID cards are expected to provide at least the following two features with a high degree of reliability. First, the ID card must be associated with a person who carries the ID card by providing some verifiable biometric values. Second, there must be an easy way to detect counterfeit or altered ID cards.

One approach is to have a photo on the ID card that may be verified as authentic. There are several existing technologies that attempt to address this issue. One technology allows for the digital watermarking of the photo by artificially altering predetermined portions of the photo. The photo is then verified by detecting the existence of the digital watermark. The digital watermarking technology, however, has a disadvantage that a substituted photo with the same watermarking cannot be detected.

Another existing technology is utilization of a photo verification database. However, this technology is costly because it requires specialized verification equipment and a communication channel to the photo verification database. Furthermore, this technology relies on the database being available for a verification procedure at any given time.

There is, therefore, a need for an ID card system that allows for the detection of an alerted photo. At the same, the system should be independent of a database (e.g., self-verifying). Furthermore, the system should be one that may be implemented with relatively inexpensive hardware, and require only a small amount of data to be stored on the ID card. The system should also be robust enough to work despite variations in a verification device's performance and wear and tear on the ID card.

SUMMARY OF THE INVENTION

The present invention relates to a system and method for verifying a self-authenticating document. First, an image is obtained of at least a predetermined portion of the document. Then, the image is divided into a predetermined number of pixel groups, each pixel group including a plurality of pixels and pixel characteristic data for each pixel is determined. A pixel group classification data for each pixel group is determined as a function of the pixel characteristics data. Based on the pixel group classification data and a location of the corresponding pixel group in the image, a characteristic digital data "CDD" for the image is generated. The CDD is added to the document.

Upon a request for verification of the document, the CDD is extracted from the document. Then, a further CDD based on the image is generated. The document is verified only if the CDD is substantially identical to the further CDD.

BRIEF DESCRIPTION OF DRAWINGS

FIG. 3c shows Table A illustrating an exemplary classification scheme for the pixel groups;

DETAILED DESCRIPTION

Figure 1:
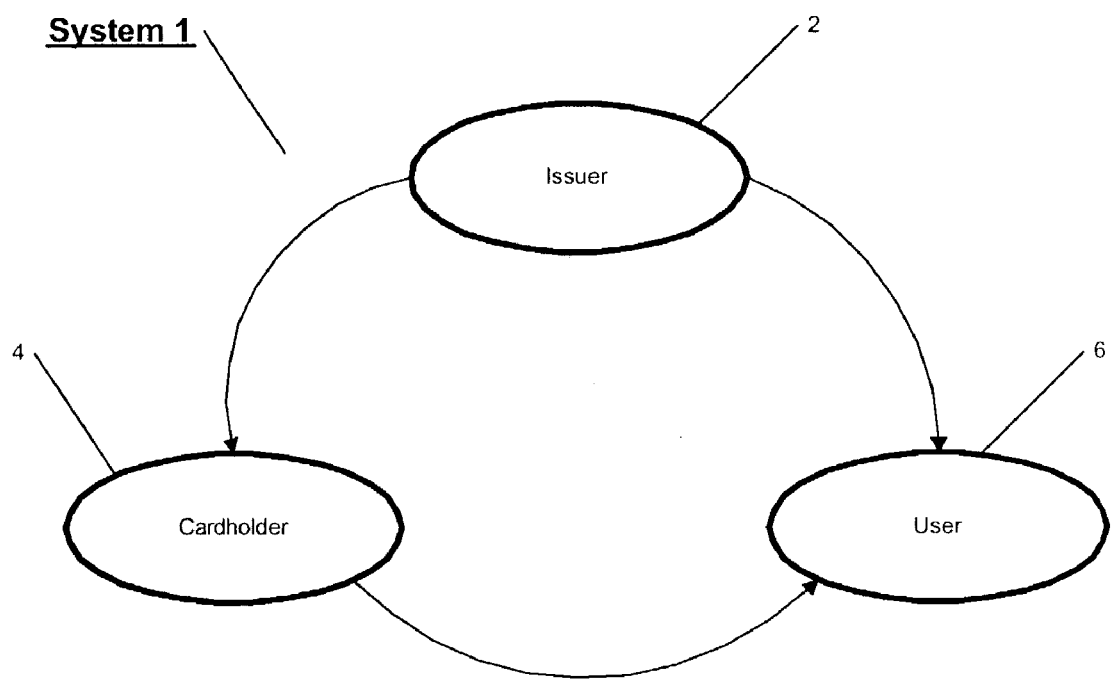
FIG. 1 shows an exemplary system according to the present invention.

The present invention relates to a system and method for generating and verifying a self-authenticating document, and in particular, an identification card. FIG. 1 shows an exemplary system 1 according to the present invention. The system 1 may include an issuer 2, a cardholder 4 and a user 6. The issuer 2 may be an entity that performs a background check verification procedure to confirm the identity of the cardholder 4 and issues an identification ("ID") card 8 (shown in FIG. 2) to the cardholder 4. The cardholder 4 may be a person or entity whose identity needs to be securely verified. The user 6 may be an entity (e.g., the police, bank, etc.) that requires reliable identification of the cardholder 4.

Upon the user's 6 request for a reliable form of identification, the cardholder 4 may present the ID card 8 issued by the issuer 2. The user 6 may then verify the information on the ID card 8 and determine if the ID card 8 belongs to the cardholder 4. This may eliminate the need for the user 6 to perform the background check verification procedure or even to contact the issuer 2 to verify an identification of the cardholder 4.

Figure 2:
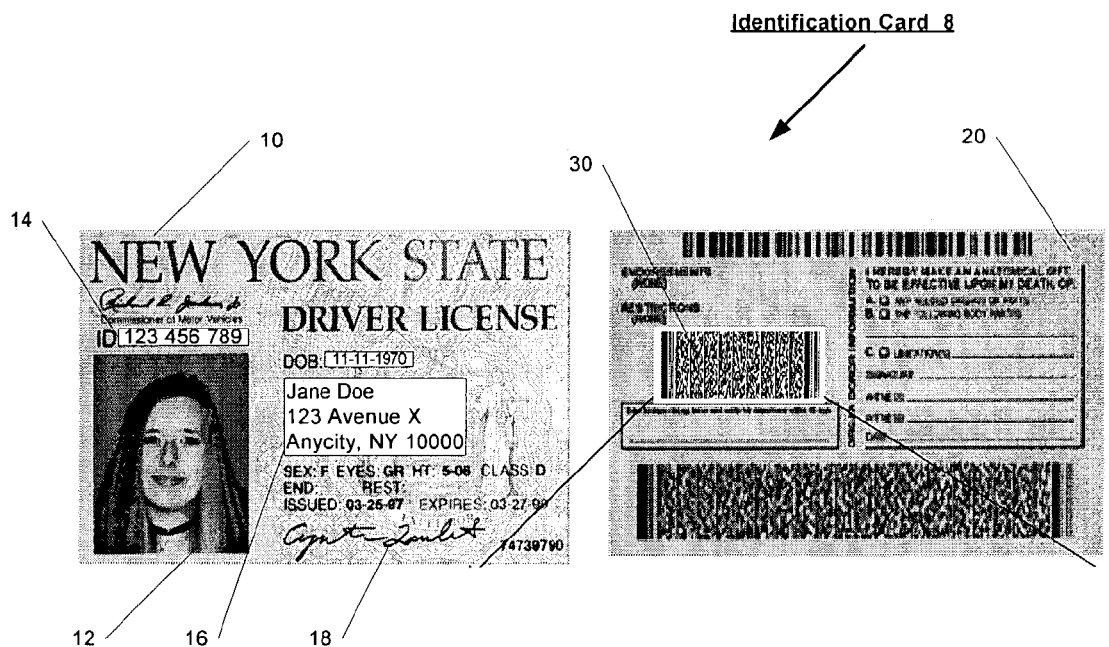
FIG. 2 shows an exemplary embodiment of an identification card according to the present invention.

FIG. 2 shows an exemplary embodiment of the ID card 8 according to the present invention. The ID card 8 may be a driver license issued by a local Department of Motor Vehicles ("DMV"), a passport issued by the State Department, etc. The ID card 8 may have a front portion 10 and a back portion 20. The front portion 10 may include a photo 12, an ID number 14, personal information 16, a signature 18, etc. The front portion 10 may also include biometric identifiers such as a fingerprint, an iris scan, etc.

The back portion 20 of the ID card 8 may contain certain data stored in a format that may be reliably captured by an ID card scanner/reading arrangement. In the preferred embodiment, the data is stored in a two-dimensional ("2D") bar code 30. The data encoded in the 2D bar code 30 may include the data shown on the front portion 10. In addition, the data may include certain information that allows for the verification of the ID card 8 (e.g., characteristic digital data "CDD" of the photo 12). The bar code 30 may be combined with another barcode, if any, which may be already placed on the back portion 20. Those skilled in the art would also understand that the bar code 30 along with any other information situated on the back portion 20 may be situated on the front portion 10.

Figure 3A:
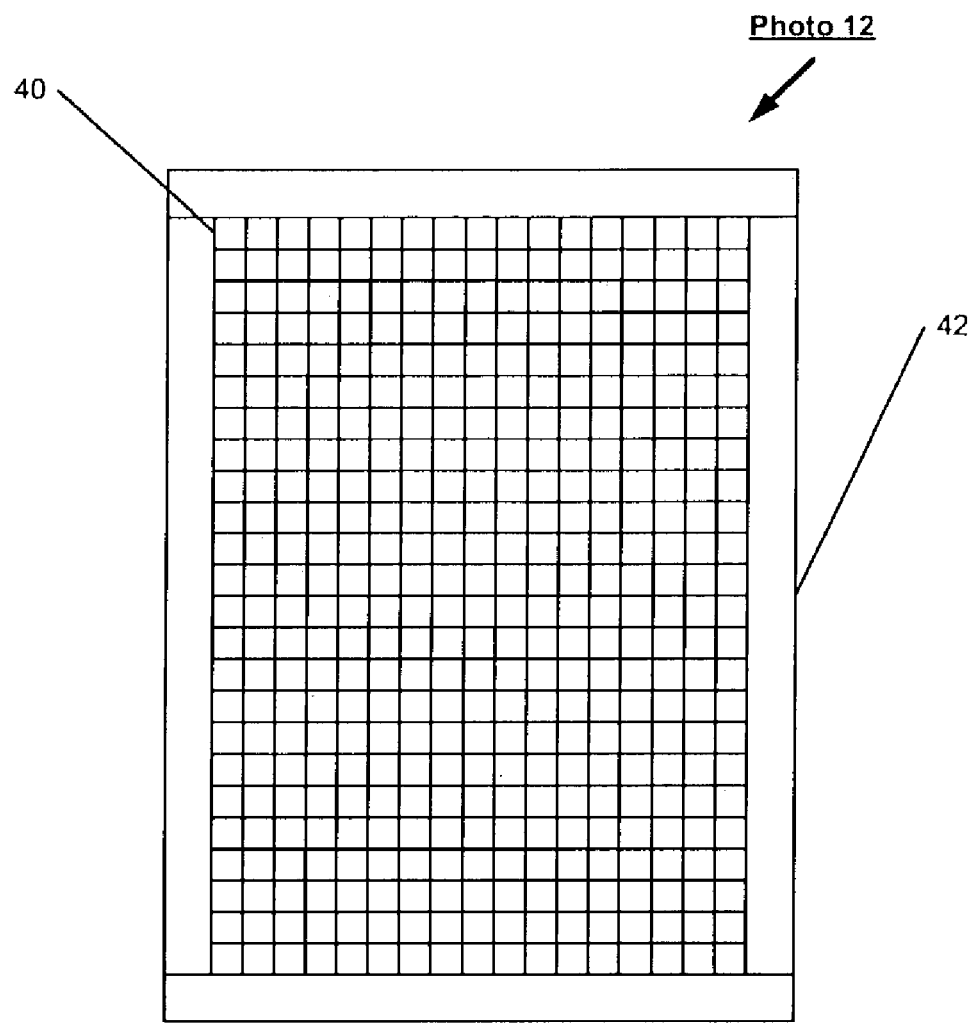
FIG. 3a shows an exemplary embodiment of a photo split into pixel groups.

FIG. 3a shows an exemplary embodiment of a scanned image of the photo 12 subdivided into pixel groups to create the CDD (this subdivision is imaginary and is not actually drawn). A center portion of the image may be split into a regularly-spaced grid of pixel groups 40. For example, the grid may be 16 columns by 24 rows of the pixel groups 40. The number of the pixel groups 40 may be a function of the ideal size of the CDD and the number of bits needed to classify the pixel group 40. The edges of the image may contain border area 42 that are not included in the pixel groups 40.

The border area 42 may contain a prearranged pattern. In the preferred embodiment, the pattern includes lines of different and distinct thickness and luminance. These lines allow the scanning arrangement to self-calibrate (i) alignment and (ii) response to luminance when scanning the ID card 8. This prearranged pattern may also convey information about the size of the pixel group grid, the location of columns and rows within the grid, etc.

Figure 3B:
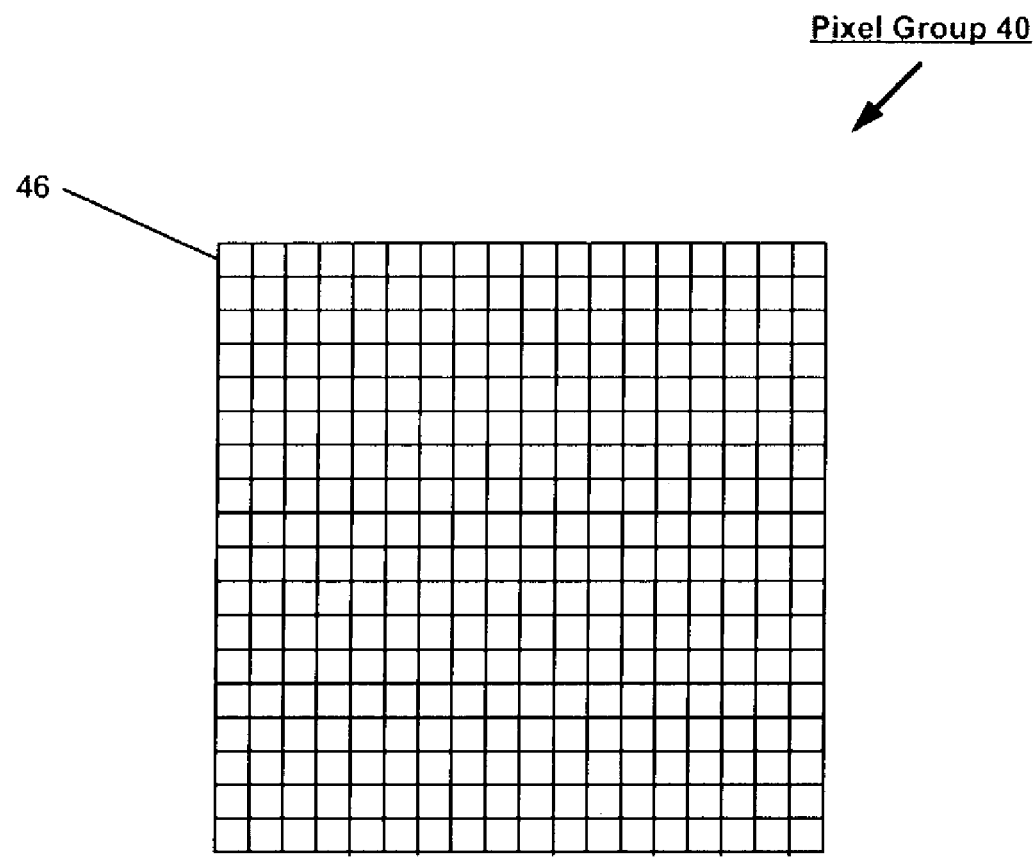
FIG. 3b shows an exemplary embodiment of a pixel group.

FIG. 3b shows an exemplary embodiment of the pixel group 40 subdivided into a plurality of pixels. For example, the pixel group 40 may be a square shape and contain a grid of 18 by 18 pixels 46. The size of the pixel group 40 may be a function of the size of the photo 12, the number of pixel groups 40 and a density of (dots per inch) of printed images.

Certain factors may be considered when determining the number of pixel groups 40 as it affects the size of the pixel group 40. For example, slight misalignments in scanning may have less of an effect when the pixel group 40 is large. On the other hand, if the size of the pixel group 40 increases, then the CDDs of two different photos may become less unique. Therefore, optimization of the number of the pixel groups 40 for a particular application may be necessary.

Figure 4:
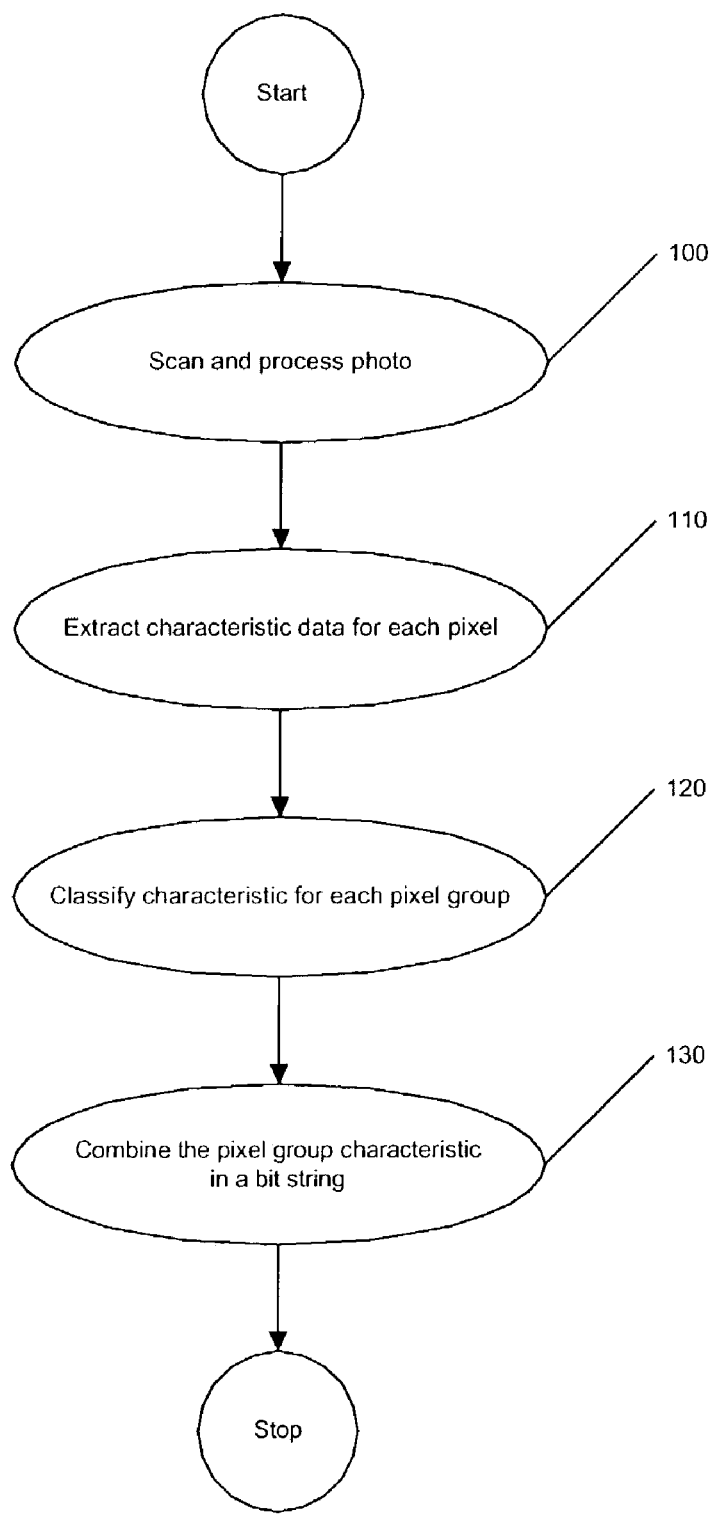
FIG. 4 shows an exemplary embodiment of a method for generating characteristic digital data according to the present invention.

FIG. 4 shows an exemplary embodiment of a method according to the present invention. In Step 100, the photo 12 is scanned, using the arrangement, to generate a digital image representation of the photo 12. The arrangement processes the digital representation by dividing it into a predetermined number of the pixel groups 40. A number of pixels 46 of the pixel group 40 depends on a resolution of the arrangement. The arrangement may have a resolution of 300 pixels per inch, or 135,000 pixels in 1 inch by 1.5 inches, which may be a typical size for the photo 12. Some arrangements may represent each pixel 46 as an eight-bit gray value and other arrangement may represent each pixel with three 8-bit numbers representing the amount of red, green and blue for a total of 24 bits.

In Step 110, a subset of the characteristic data for each pixel 46 is extracted. For example, if the image is a color image, using the values red, green and blue, a characteristic brightness or luminance of the pixel 46 may be determined by the following equation:

luminance=0.3×red+0.59×green+0.11×blue.

However, if the image is a monochrome gray scale, then the characteristic data of pixels is the digitized value for that pixel.

One skilled in the art understands that other characteristic values of the pixel 46 may be used (e.g., the value of a single color). Furthermore, one skilled in the art understands that the number of bits representing the values depends upon the sophistication of the arrangement.

In Step 120, each pixel group 40 is classified into a number of predetermined subsets. The number of subsets may be determined as a function of the number of bits that may be used to represent the pixel group 40. In the exemplary embodiment, the pixel group 40 may be allocated with two bits. In such case, as illustrated in Table A of FIG. 3c, the pixel group 40 may be classified into four subsets: 0, 1, 2, 3. Those skilled in the art will understand that three or more bits per pixel group 40 may be utilized. An average pixel group characteristic data for a particular pixel group is determined as an average of all pixel characteristic data in that pixel group 40. If the allowed range of individual pixel value is between 0 and 255 and the average pixel group classification is, for example, between 0 and 63, then the pixel group 40 is given a classification of 0.

In Step 130, the CDD is determined as a function of the pixel classification characteristic data and location of the corresponding pixel group 40 in the photo 12. For example, the CDD may be stored as a bit string where left-to-right row-by-row pixel classification data starts from an uppermost row of the photo 12.

Figure 5:
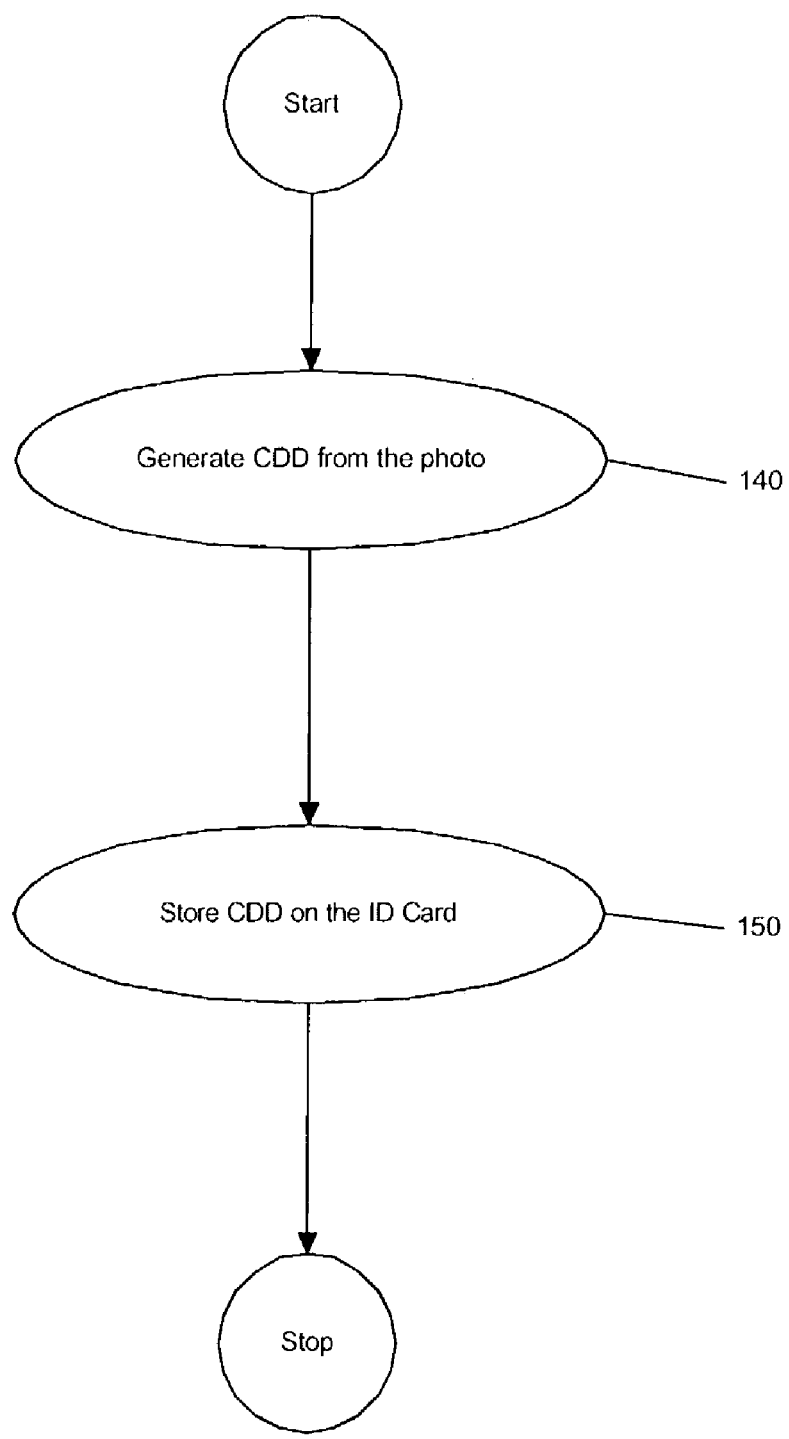
FIG. 5 shows an exemplary embodiment of a method for issuing the identification card.

FIG. 5 shows an exemplary method according to the present invention for generating the ID card 8. Initially, the issuer 2 obtains necessary information about cardholder 4 (e.g., data shown on the front portion 10). In Step 140, the issuer 2 generates the CDD as a function of the photo 12 by utilizing the method described above and shown in FIG. 4.

In Step 150, the issuer 2 generates the ID card 8 which includes the CDD. In particular, the issuer 2 may combine the generated CDD with other data (e.g., the ID number 14, the personal information 16, etc.) to create a single data file. The issuer 2 may then digitally secure the file using one of conventional digital signature technologies (e.g., RSA digital signature and Digital Signature Algorithm (DSA), etc.).

In the exemplary embodiment of the present invention, the file may be stored in the form of the 2D bar code 30. Those skilled in the art understand that the file with the CDD may be stored on the ID card 8 utilizing other data storage formats (e.g., an embedded chip in a "smart" card). Once the ID card 8 is generated, it is forwarded to the cardholder 4.

Figure 6:
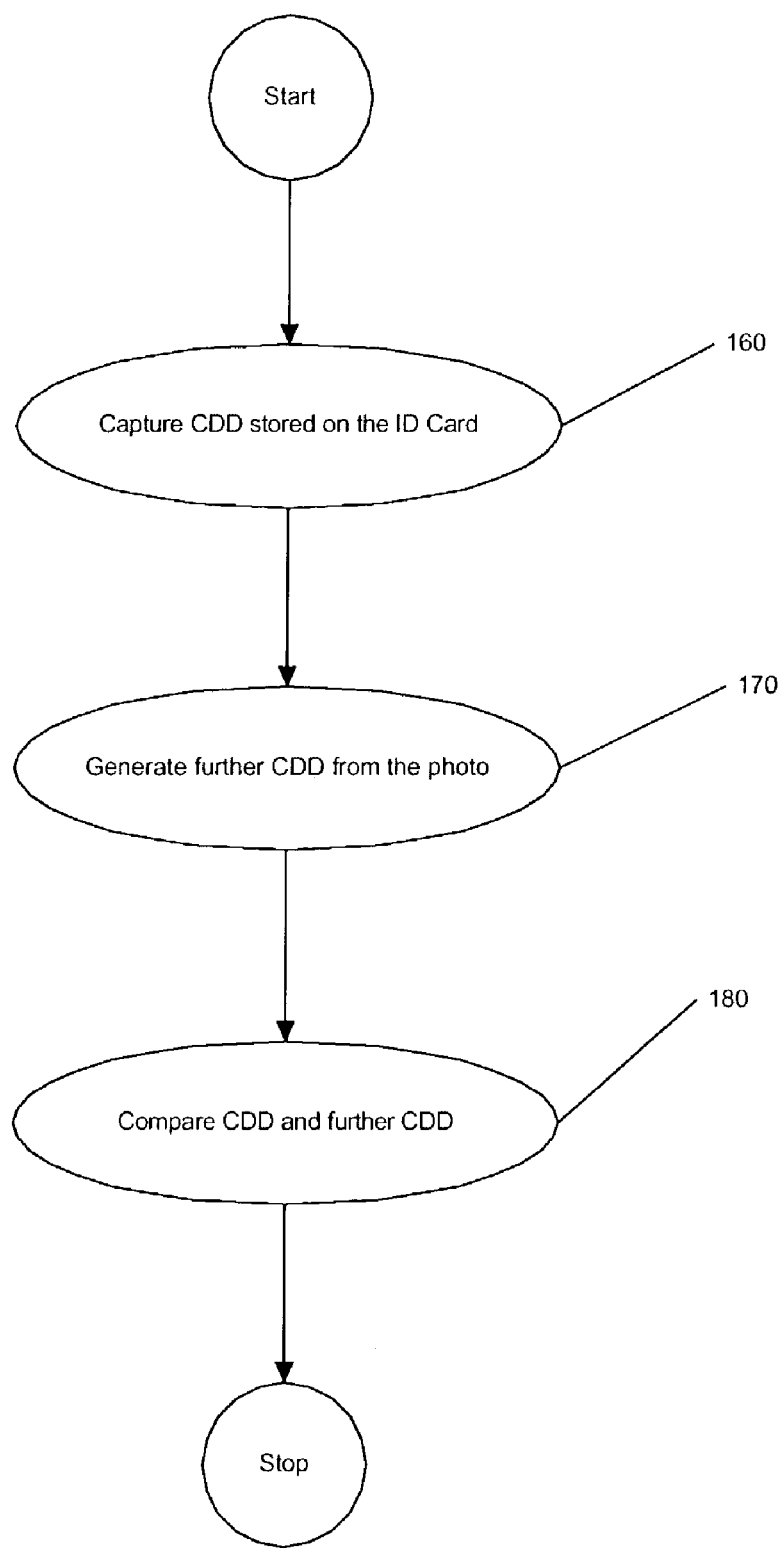
FIG. 6 shows an exemplary embodiment of a method for verifying a customer using the identification card.

FIG. 6 shows an exemplary embodiment of a method according to the present invention for verifying the identity of the cardholder 4 using the ID card 8. In particular, the cardholder 4 needs to be verified for the user 6. The cardholder 4 presents the ID card 8 to the user 6. In Step 160, the user 6 scans/reads the CDD which is stored in the ID card 8 using the arrangement. The arrangement decodes the file stored on the ID card 8, decrypts it (if the file was originally encrypted) and then extracts the stored CDD.

In Step 170, a further CDD is generated from the photo 12. This step is performed utilizing the method described above and shown in FIG. 4. In particular, the arrangement, as previously mentioned, scans the photo 12 and utilizes the border pixel pattern to self-calibrate and ensures reliable results. The further CDD is generated as described above.

In Step 180, the stored CDD and the further CDD are compared to verify the authenticity of the photo 12. Due to imperfections in the scanning process and wear and tear on the ID card 8, a perfect match between the CDDs may not always be expected. The user 6 may, therefore, set a predetermined threshold of similarity between the CDDs for verification of the cardholder 4. For example, the user 6 may decide the CDDs must be substantially similar (e.g., above 80%); but in particular cases, they must be 96% identical, etc.

The arrangement may employ a matching algorithm that applies more weight to severe mismatches (e.g., a difference of two levels of luminance is a graver mismatch than one level luminance). The algorithm may also attach a greater weight to the matches and mismatches toward the center of the photo 12 or where there is likely to exist more unique features within the photo 12. In addition, finding two-dimensional matches or mismatches in luminance changes across a boundary that extends along multiple groups (e.g., changes of luminance between groups) may be strongly weighted by the algorithm.

There are many modifications to the present invention that will be apparent to those skilled in the art without departing from the teaching of the present invention. The embodiments disclosed herein are for illustrative purposes only and are not intended to describe the bounds of the present invention which is to be limited only by the scope of the claims appended hereto.

What is claimed is:

1. A method for verifying a self-authenticating document, comprising the steps of:
   (a) obtaining an image of at least a predetermined portion of the document;
   (b) dividing the image into a predetermined number of pixel groups, each pixel group including a plurality of pixels;
   (c) determining pixel characteristic data for each pixel;
   (d) determining a pixel group classification data for each pixel group as a function of the pixel characteristics data of at least one pixel in the pixel group;
   (e) generating a characteristic digital data "CDD" for the image as a function of the pixel group classification data and a location of the corresponding pixel group in the image;
   (f) adding the CDD to the document;
   (g) upon a request for verification of the document, extracting the CDD from the document;
   (h) repeating steps (a)–(e) to generate a further CDD based on the image; and
   (i) verifying the document if the CDD is substantially identical to the further CDD.

2. The method of claim 1, further comprising the step of: before step (f), digitally securing the CDD using a predetermined encryption system.

3. The method of claim 2, further comprising the step of: before step (i), verifying the digitally secured CDD.

4. The method of claim 1, wherein the step (f) includes the following substeps:
   generating a barcode which includes the CDD; and
   securely attaching the barcode to the document.

5. The method of claim 4, wherein the barcode is a two-dimensional barcode.

6. The method of claim 1, wherein steps (a) & (h) are performed using an arrangement which includes a digital scanner.

7. The method of claim 1, wherein step (b) includes the following substeps:
   dividing the image into a center portion and a border portion; and
   dividing the center portion into the predetermined number of pixel groups,
   wherein the border portion is capable of containing data relating to the center portion.

8. The method of claim 1, wherein the number of pixel groups is determined as a function of at least one of a size of the CDD and a size of the pixel group classification data.

9. The method of claim 1, wherein a size of each pixel group is determined as a function of at least one of a size of the image, the number of pixel groups and a density of the image.

10. The method of claim 1, wherein, if the image is a monochrome gray image, the characteristic data of each pixel is a digitized value of the corresponding pixel.

11. The method of claim 1, wherein, if the image is a color image, the characteristic data of each pixel is determined as a function of a digitized red value, a digitalized blue value and a digitized green value of the corresponding pixel.

12. The method of claim 1, wherein the pixel group classification data is an average value of each pixel characteristic data.

13. A method for generating a self-authenticating document, comprising the steps of:
   obtaining an image of at least a predetermined portion of the document;
   dividing the image into a predetermined number of pixel groups, each pixel group including a plurality of pixels;
   determining pixel characteristic data for each pixel;
   determining a pixel group classification data for each pixel group as a function of the pixel characteristics data of at least one pixel in the pixel group;
   generating a characteristic digital data "CDD" for the image as a function of the pixel group classification data and a location of the corresponding pixel group in the image; and
   adding the CDD to the document.

14. A system for verifying a self-authenticating document, comprising:
   a first arrangement including a processor, a digital scanner and an output device, the first arrangement obtaining an image of at least a predetermined portion of the document using the digital scanner, the processor dividing the image into a predetermined number of pixel groups, each pixel group including a plurality of pixels, the processor determining pixel characteristic data for each pixel, the processor determining a pixel group classification data for each pixel group as a function of the pixel characteristics data of at least one pixel in the pixel group, the processor generating a characteristic digital data "CDD" for the image as a function of the pixel group classification data and a location of the corresponding pixel group in the image, the output device adding the CDD to the document; and
   a second arrangement including a processor, a digital scanner and an input device, wherein, upon a request for verification of the document, the input device extracts the CDD from the document, the processor generating a further CDD based on the image, the second arrangement verifying the document if the CDD is substantially identical to the further CDD.

15. The system of claim 14, wherein the first arrangement digitally secures the CDD.

16. The system of claim 15, wherein the second arrangement verifies the digitally secured CDD.

17. The system of claim 14, wherein the output device is a barcode generator which generates a barcode which includes the CDD and securely attaches the barcode to the document.

18. The system of claim 17, wherein the input device is a barcode reader which reads the barcode and extracts the CDD from the barcode.

19. The system of claim 17, wherein the barcode is a two-dimensional barcode.

20. An arrangement for generating a self-authenticating document, comprising:
   a digital scanner the digital scanner obtaining an image of at least a predetermined portion of the document;
   a processor dividing the image into a predetermined number of pixel groups, each pixel group including a plurality of pixels, the processor determining pixel characteristic data for each pixel, the processor determining a pixel group classification data for each pixel group as a function of the pixel characteristics data of at least one pixel in the pixel group, the processor generating a characteristic digital data "CDD" for the image as a function of the pixel group classification data and a location of the corresponding pixel group in the image; and
   an output device adding the CDD to the document.

* * * * *